United States Patent
Kohn et al.

(10) Patent No.: US 6,938,119 B2
(45) Date of Patent: Aug. 30, 2005

(54) DRAM POWER MANAGEMENT

(75) Inventors: Leslie D. Kohn, Fremont, CA (US); Kunle A. Olukotun, Stanford, CA (US); Michael K. Wong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 243 days.

(21) Appl. No.: 10/273,806

(22) Filed: Oct. 18, 2002

(65) Prior Publication Data

US 2003/0093614 A1 May 15, 2003

Related U.S. Application Data

(60) Provisional application No. 60/345,315, filed on Oct. 22, 2001.

(51) Int. Cl.[7] .............................................. G06F 12/00
(52) U.S. Cl. ........................ 711/105; 711/154; 711/156; 713/320; 713/321; 713/322; 713/323; 713/330; 713/340; 713/400; 713/401; 713/500; 713/501
(58) Field of Search ................................. 711/105, 154, 711/156, 167; 713/320, 321, 322, 323, 324, 330, 340, 400, 401, 500, 501, 502, 503, 600

(56) References Cited

U.S. PATENT DOCUMENTS

| | | | |
|---|---|---|---|
| 3,736,569 A | | 5/1973 | Bouricius et al. |
| 5,083,266 A | * | 1/1992 | Watanabe .................... 713/601 |
| 6,021,076 A | | 2/2000 | Woo et al. |
| 6,151,681 A | * | 11/2000 | Roden et al. ................ 713/322 |

FOREIGN PATENT DOCUMENTS

| EP | 0 777 182 | 6/1997 |
|---|---|---|
| WO | WO92/10032 | 6/1992 |

OTHER PUBLICATIONS

PCT International Search Report (4 pages).

* cited by examiner

Primary Examiner—Mano Padmanabhan
Assistant Examiner—Mehdi Namazi
(74) Attorney, Agent, or Firm—Martine Penilla & Gencarella, LLP

(57) ABSTRACT

A system and method for limiting power consumption of a computer memory system. The system and method includes selecting a memory access rate. The selected memory access rate corresponds to a desired average memory power consumption rate. A first time interval is started as a current time interval. A memory system is accessed. If the memory access rate has not been exceeded, then the access is applied to the memory system. Alternatively, if the memory access rate has been exceeded, then the access is delayed until the current time interval has expired and a subsequent time interval is started as the current time interval and the access is applied to the memory system.

18 Claims, 3 Drawing Sheets

DRAM POWER MANAGEMENT

CROSS REFERENCE TO RELATED APPLICATIONS

This application claims priority from U.S. Provisional Patent Application No. 60/345,315 filed on Oct. 22, 2001 and entitled "High Performance Web Server," which is incorporated herein by reference in its entirety for all purposes.

BACKGROUND OF THE INVENTION

1. Field of the Invention

The present invention relates generally to computer systems, and more particularly, to methods and systems for managing power consumption of computer memory systems.

2. Description of the Related Art

Power consumption by computers and computing devices is an issue for many reasons. Examples include portable computing devices that have a limited power source (i.e., battery), large server computer systems that process large quantities of data but also consume large quantities of power in the process, and the cooling required to remove the heat that is produced as the power is consumed by the computing devices. The total power consumed by a computer is constantly being driven lower and lower. By way of example, a portable "laptop" computer's battery is a finite power source. One aspect of performance of a laptop computer is how long it can operate on the battery. A larger and heavier battery can typically extend the operating time but because the laptop is also rated for its light weight, increases in battery weight are typically avoided. Therefore the power management and efficiency of a laptop computer is an important feature.

Another example of power management is in a server computer. A server computer processes so much data that it also consumes large quantities of power. Further, when multiple servers are combined into a "server farm" to work together, the power consumption becomes very high. Because much of the consumed power is converted to heat, the servers are typically actively cooled by air conditioning and refrigeration systems which further increases the overall power consumption of the server.

Power efficiency of computers has been addressed through various methods such that now the power consumption of a high efficiency computer's memory system can far outweigh the power consumption of the processor itself. By way of example, a high efficiency processor consumes approximately 40 watts of power. Such high efficiency processors in a server can have 16 or more DRAM (dynamic random access memory) DIMMs (dual in-line memory modules) in the memory system. Each of the DIMMs consume approximately 14 watts of power at maximum access (i.e., read/store) rates, resulting in a total of 224 watts power consumption for the 16 DIMMs, at maximum access rates.

Typical power usage, though, is much lower. The reason typical power usage is lower is because the DIMMs are not always being used at maximum access rates. Each time a memory cell within a DIMM is written to or read from, a small amount of power is consumed. Therefore, the number of times a DIMM is accessed in a given time interval impacts the total power usage of that DIMM.

FIG. 1 is a high-level block diagram of a typical computer system 100. As shown, the computer system 100 includes a processor 102, ROM 104, and RAM 106, each connected to a bus system 108. The bus system 108 may include one or more buses connected to each other through various bridges, controllers and/or adapters, such as are well known in the art. For example, the bus system 108 may include a "system bus" that is connected through an adapter to one or more expansion buses, such as a Peripheral Component Interconnect (PCI) bus. Also coupled to the bus system 108 are a mass storage device 110, a network interface 112, and a number (N) of input/output (I/O) devices 116-1 through 116-N.

The I/O devices 116-1 through 116-N may include, for example, a keyboard, a pointing device, a display device and/or other conventional I/O devices. The mass storage device 110 may include one or more of any devices that are suitable for storing large volumes of data, such as a magnetic disk or tape, magneto-optical (MO) storage device, or any of various types of Digital Versatile Disk (DVD) or Compact Disk (CD) based storage.

Network interface 112 provides data communication between the computer system and other computer systems on a network such as a local area network, wide area network, the Internet or other networks. Hence, network interface 112 may be any device suitable for or enabling the computer system 100 to communicate data with a remote processing system over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

The RAM 106 can include multiple DIMMs 106-1 through 106-N. In a typical application, a average access rate of a DIMM results in an average 6-watt power consumption. However, as discussed above, the maximum access rate can cause the power to increase to as much as 14 watts for each DIMM 106-1 through 106-N.

In view of the foregoing, what is needed is a system and method to reduce or limit the maximum power consumption of each DIMM as seen by the power supply without significantly impacting the performance of the processor.

SUMMARY OF THE INVENTION

Broadly speaking, the present invention fills these needs by providing a system and a method for managing DRAM power consumption. It should be appreciated that the present invention can be implemented in numerous ways, including as a process, an apparatus, a system, or a device. Several inventive embodiments of the present invention are described below.

One embodiment includes a computing system that includes a processor, a memory system, a DRAM controller and a bus that couples the memory system, the processor and the DRAM controller. The memory system can include at least one DRAM module. The DRAM controller is operable to limit an access rate (i.e. number of accesses in a given time interval) to the at least one DRAM module so that a DRAM module power consumption rate is less than or equal to a desired average memory power consumption rate.

The DRAM controller can include a state machine.

The access rate can be equal to a number of accesses per a current time interval.

The computer system can also include a power supply for the memory system.

The length for the current time interval can be less than about a regulation time constant of the power supply for the memory system.

One advantage of the present invention is that DRAM power spikes that are higher than the desired maximum power consumption and shorter than the regulation time constant can be supplied by the power supply decoupling capacitors without affecting the power supply or processor operation.

The length for the current time interval can be equal to about 10 microseconds. The current time interval is long enough that the DRAM access rate in the current time interval will seldom exceed the long term average. As a result, limiting the number of DRAM accesses in the current time interval will have minimal impact on the performance of the processor.

The desired memory power consumption rate can be equal to about 66 percent of a maximum power consumption rate of the at least one DRAM module. Alternatively, the desired memory power consumption rate can be equal to about 9 watts for each of the at least one DRAM module.

The processor can also include the DRAM controller.

Another embodiment includes a method for limiting power consumption of a computer memory system. The method includes selecting a memory access rate. The selected memory access rate corresponds to a desired average memory power consumption rate. A first time interval is started as a current time interval. A memory system is accessed. If the memory access rate has not been exceeded, then the access is applied to the memory system. Alternatively, if the memory access rate has been exceeded, then the access is delayed until the current time interval has expired and a subsequent time interval is started as the current time interval and the access is applied to the memory system.

Accessing the memory system can include determining if the current time interval has expired. If the current time interval has expired, then a subsequent time interval is started as the current time interval and the access is applied to the memory system. Alternatively, if the current time interval has not expired then an access counter incremented. The access counter can be part of the DRAM controller.

The access rate is equal to a number of accesses per a current time interval.

In one embodiment, selecting the memory access rate includes selecting a length for the current time interval.

In one embodiment, the DRAM controller controls access to the memory system.

The present invention provides the advantage of substantially reducing the worst case power consumption of the memory system, as seen by the power supply and the cooling system without substantially impacting the performance of the memory system. Reducing the worst case power consumption allows for a smaller overall power supply to be used. Reducing the worst case power consumption also reduces the peak demand on the cooling systems and methods thereby allow a smaller overall cooling system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments for managing DRAM power consumption will now be described. It will be apparent to those skilled in the art that the present invention may be practiced without some or all of the specific details set forth herein.

As discussed above, in a typical application, the DIMM at typical access rates results in an average of about 6 to 9 watts of power consumption by the DIMM. The same DIMM can have a maximum power consumption at a maximum access rate of as much as 14 watts. In one embodiment, the system and method for reducing the power consumption of the DIMM is a method of limiting the number of accesses to the DIMM for a given time interval so that a maximum power consumption for DIMM does not exceed a pre-selected amount.

In one embodiment, the access rate can be limited to a selected rate such that the power consumption cannot exceed a corresponding power level for a pre-selected time interval. By way of example, the corresponding power consumption can be about 66 percent of the maximum power consumption of the DIMM, such as about 9 watts if the DIMM consumes about 14 watts at maximum access rate. The pre-selected time interval can be about 10 microseconds. Therefore, if a DIMM access rate of 1,000 accesses per 10 microseconds resulted in a 9-watt power consumption rate of the DIMM, then the 1,001 and subsequent accesses during that same 10 microsecond period would be delayed until a subsequent 10 microsecond period.

A thermal time constant is much longer than 10 microseconds as a result the peak power consumption of the DIMM as seen by the cooling system can also be reduced by about 35% which further reduces the cooling requirements of the computer system and further reduces the power requirements of the power supply.

Figure 1:
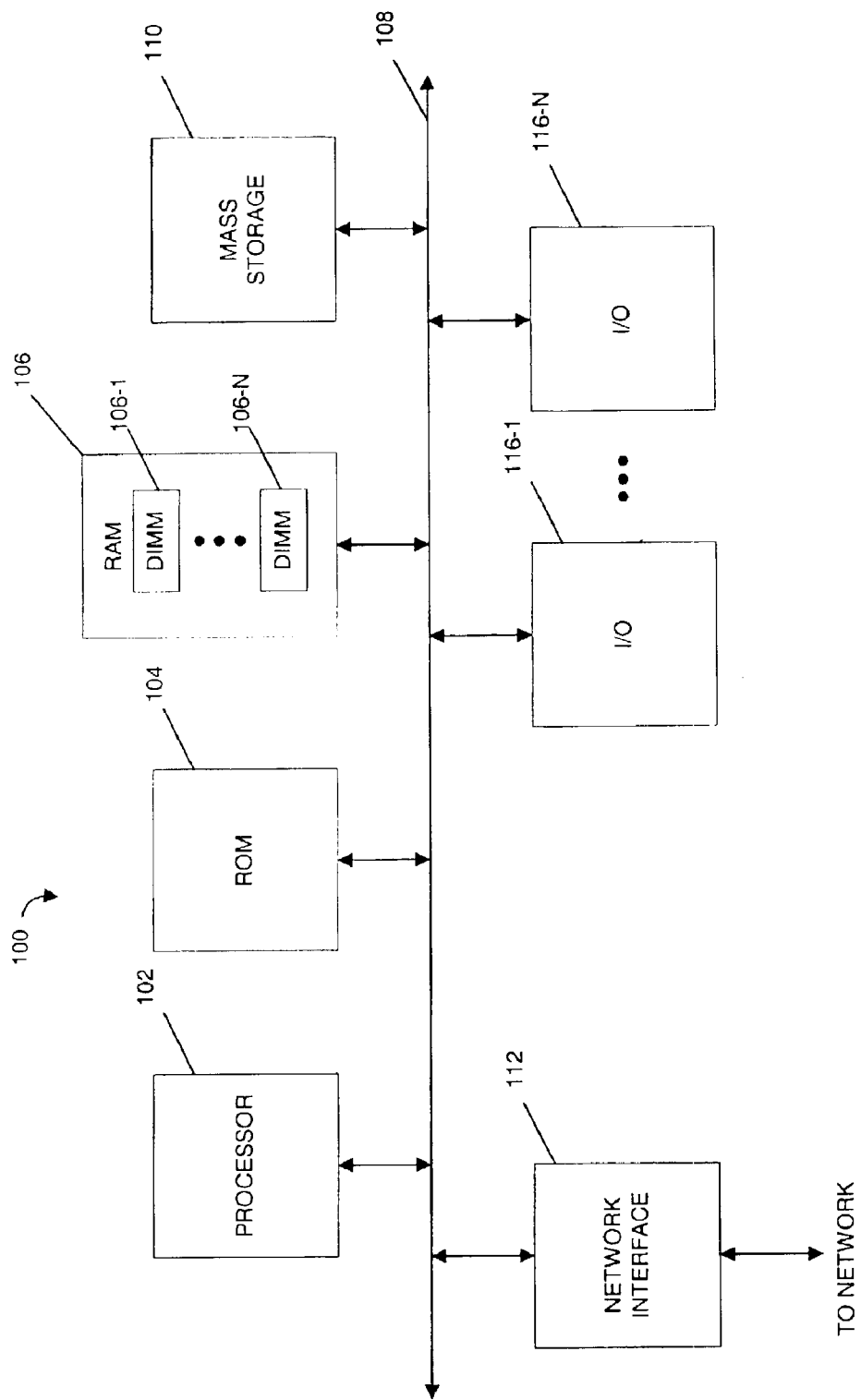
FIG. 1 is a high-level block diagram of a typical computer system.
Figure 2:
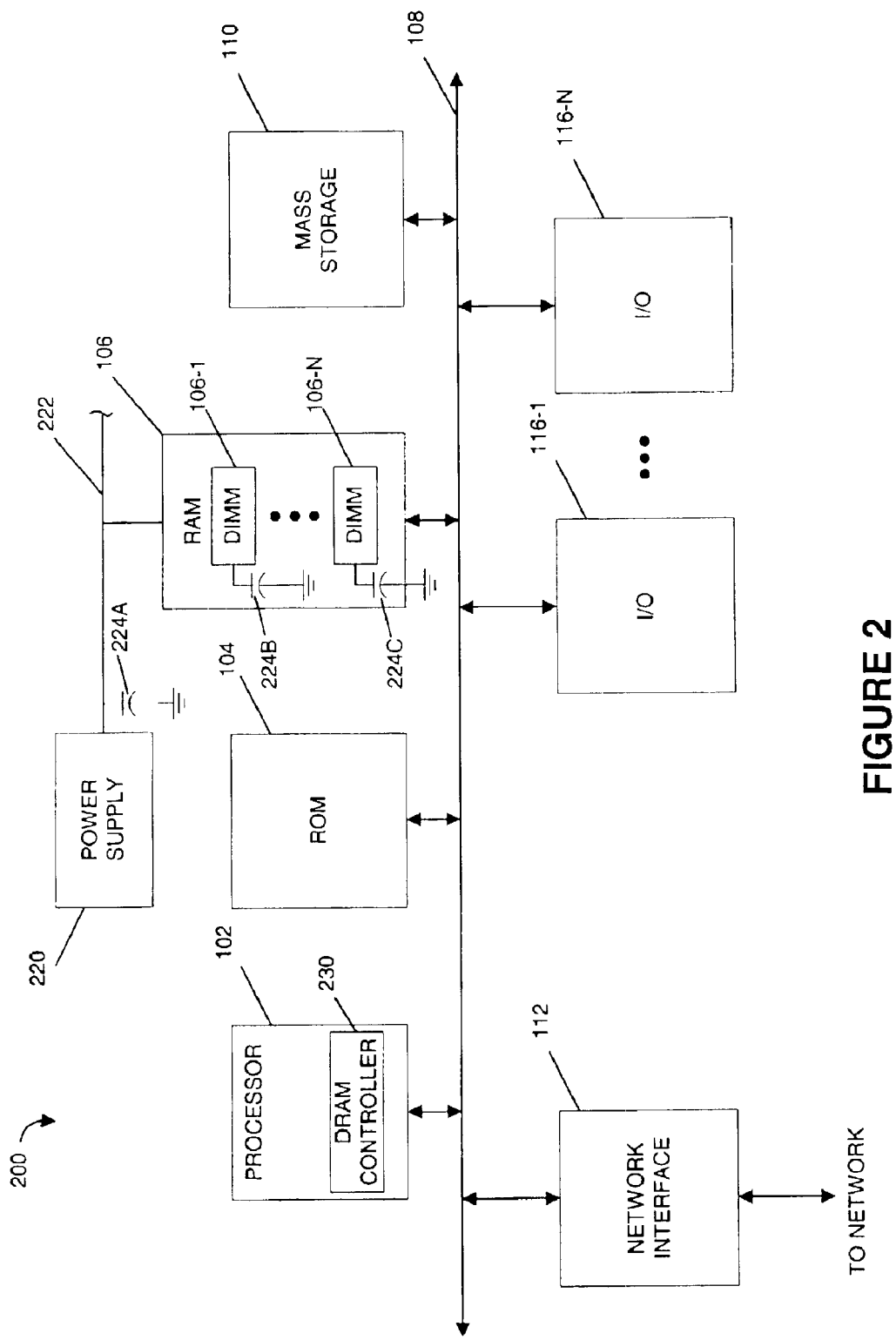
FIG. 2 is a block diagram of a computer system in accordance with one embodiment of the present invention.

FIG. 2 is a block diagram of a computer system 200 in accordance with one embodiment of the present invention. The computer system 200 includes the processor 102, the ROM 104, and the RAM 106, each connected to the bus system 108. The computer system 200 also includes the mass storage device 110, the network interface 112, multiple (N) of input/output (I/O) devices 116-1 through 116-N and a power supply 220. The computer system 200 can also include a DRAM controller 230 for controlling the accesses to the RAM 106. The DRAM controller 230 can be part of the processor 102 or part of the bus system 108 or part of the RAM 106. The DRAM controller 230 can also be a state machine.

The power supply 220 supplies the power to the various components of the computer system 200. In particular, the power supply 220 supplies current to the DIMMs 106-1 through 106-N via a power supply rail 222. The power supply 220 includes one or more decoupling capacitors 224A. Each of the DIMMs 106-1 through 106-N can also include one or more decoupling capacitors 224B, 224C.

Typically, the power supply 220 has a regulation time constant which is the time required for the power supply 220 to respond to a change in current demand on the power supply rail 222. By way of example, if the regulation time constant is 10 microseconds, then, if the current demand on the power supply rail 222 increases from 200 ma to 300 ma, then the power supply 220 would lag in delivering the 100 ma increase (300 ma total) of current to the power supply rail 222 for approximately 10 microseconds. In another example, if the number of accesses on the DIMMs 106-1 through 106-N suddenly (e.g., in 5 microseconds) doubled, then the current draw by the DIMMs 106-1 through 106-N would just as suddenly approximately double. However, because the power supply 220 cannot increase the amount of current supplied to the power supply rail 222 in 5 microseconds, then the various decoupling capacitors 224A, 224B, 224C can partially discharge to provide the "excess demand current" during the 5 microsecond peak demand period and until the power supply 220 is able to meet the power consumption demand.

A typical regulation time constant is 10 microseconds, therefore the decoupling capacitors 224A, 224B, 224C are sized so as to be able to supply the peak currents for approximately 10 microseconds.

Figure 3:
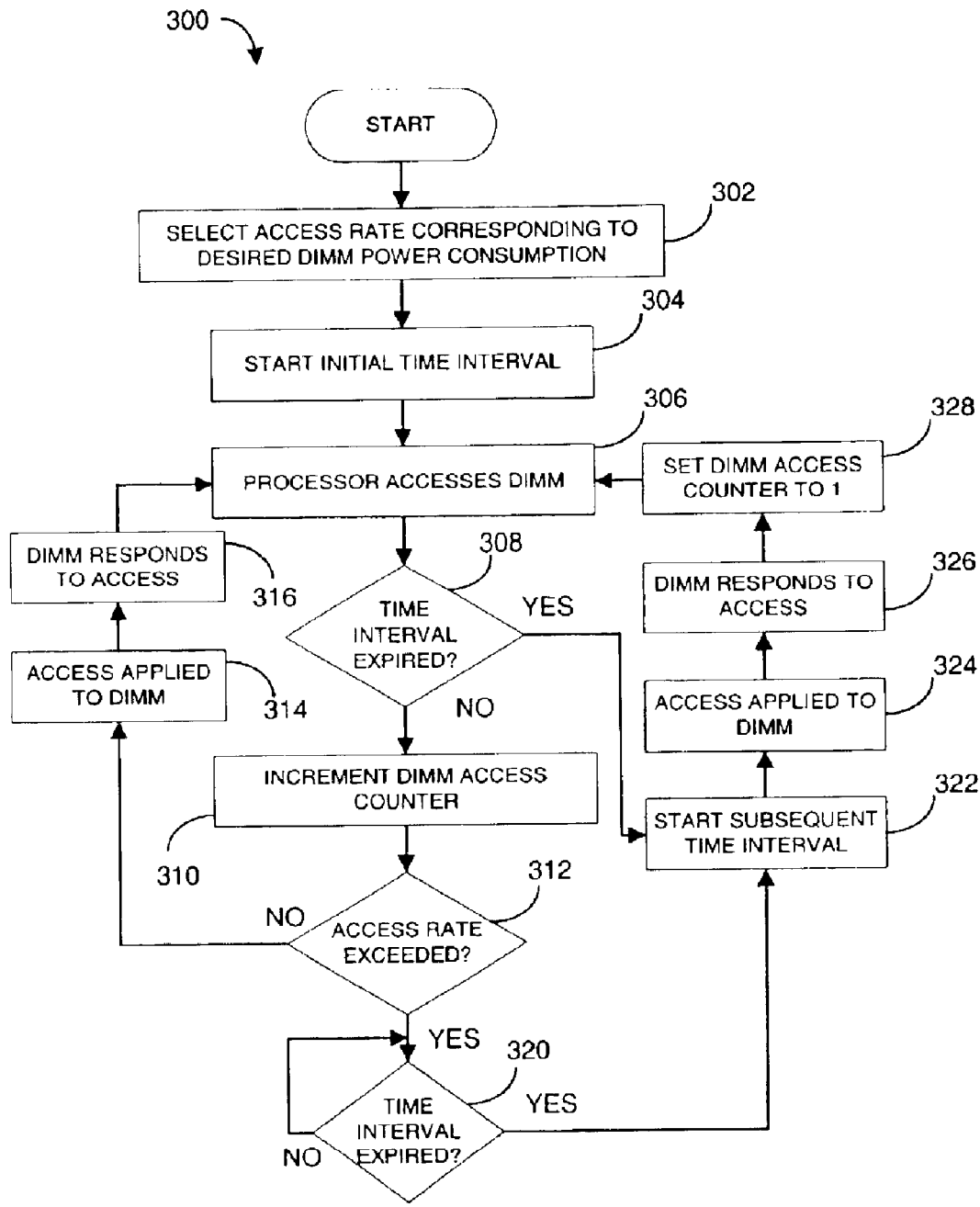
FIG. 3 is a flowchart diagram of the method operations of one embodiment of the present invention.

FIG. 3 is a flowchart diagram of the method operations 300 of one embodiment of the present invention. In operation 302 a DIMM access rate (i.e., access per a pre-selected time interval) is selected. The DIMM access rate can be selected by selecting a desired power consumption rate that corresponds to the access rate. By way of example, for a given DIMM, 1000 accesses per each 10 microsecond interval will cause the DIMM to consume 9 watts of power for each 10 microsecond time interval. Therefore, selecting 1000 accesses per 10 microsecond interval will correspond to 9 watts of power consumption. Alternatively, selecting a consumption rate of 9 watts per 10 microsecond interval will correspond to 1000 accesses per 10 microsecond interval. Selecting the access rate also includes selecting the time interval.

The selected time interval length is selected to be a relatively short time interval that is still sufficiently long enough so that there are only a few intervals where the number of attempted accesses would exceed the selected access rate. Because the the selected interval is long enough that few accesses are actually delayed, then there should be no significant performance impact on the processor. In one embodiment, a 10 microsecond time interval is adopted because the 10 microsecond time interval is also the typical power supply regulation time constant, as described above. While a 10 microsecond time interval is described herein, it should be understood that shorter and longer time intervals could also be used.

In operation 304, the initial time interval is started. A timer having the preselected time interval length can be used to monitor the time interval. The processor 102 accesses the DIMM in operation 306. In one embodiment, the DRAM controller 230 intercepts the processor's access of the DIMM to control the processor's 102 accesses to the DIMMs 106-1 through 106-N.

In operation 308, the time interval is checked to determine if the time interval has expired. If the time interval has expired, the method operations continue in operation 322 as described below. If, in operation 308, the time interval has not expired, then, in operation 310, a DIMM access counter is incremented. The DIMM access counter can be a physical counter or simply a memory location or any other method as are well known in the art to monitor a state.

In operation 312, the access rate is examined to determine if the access rate has been exceeded. By way of example, the DIMM access counter can be examined to determine if the number of access exceeds the maximum number of access in the current time interval. If, in operation 312, the access rate has not been exceeded, then the access is applied to the DIMM in operation 314 and the DIMM responds to the access in operation 316 and the method operations continue at operation 306.

If in operation 312, the access rate has been exceeded, then the time the access is delayed until the current time interval expires in operation 320. When the current time interval expires in operation 320, the method operation continue in operation 322 where a subsequent time interval is initiated. In operation 324, the access is applied to the DIMM and the DIMM responds to the access in operation 326. The DIMM access counter is reset to 1 in operation 328 and the method operations continue at operation 306.

As used herein the term "about" means +/−10%. By way of example, the phrase "about 250" indicates a range of between 225 and 275.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIG. 3 are not required to be performed in the order illustrated, and that all the processing represented by the operations may not be necessary to practice the invention. Further, the processes described in FIG. 3 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computing system comprising:
   a processor;
   a memory system, that includes at least one DRAM module;
   a DRAM controller, wherein the DRAM controller includes:
      logic for selecting a memory access rate, the selected memory access rate corresponding to a desired average memory power consumption rate;
      logic for starting a first time interval as a current time interval;
      logic for accessing a memory system;
      logic for determining if the memory access rate has not been exceeded, then applying the access to the memory system; and
      logic for determining if the memory access rate has been exceeded, then:
         logic for delaying the access until the current time interval has expired;
         logic for starting a subsequent time interval as the current time interval; and
         logic for applying the access to the memory system; and
   a bus that couples the memory system, the processor and the DRAM controller.

2. The system of claim 1, wherein the DRAM controller includes a state machine.

3. The system of claim 1, further comprising a power supply for the memory system.

4. The system of claim 3, wherein the length for the current time interval is less than a regulation time constant of the power supply for the memory system.

5. The system of claim 3, wherein the length for the current time interval is equal to about 10 microseconds.

6. The system of claim 1, wherein the desired memory power consumption rate is equal to about 66 percent of a maximum power consumption of the at least one DRAM module.

7. The system of claim 1, wherein the desired memory power consumption rate is equal to about 9 watts for each of the at least one DRAM module.

8. The system of claim 1, wherein the processor includes the DRAM controller.

9. A method for limiting power consumption of a computer memory system comprising:
   selecting a memory access rate, the selected memory access rate corresponds to a desired average memory power consumption rate;
   starting a first time interval as a current time interval;
   accessing a memory system;
   if the memory access rate has not been exceeded, then applying the access to the memory system; and
   if the memory access rate has been exceeded, then:
      delaying the access until the current time interval has expired;
      starting a subsequent time interval as the current time interval; and
      applying the access to the memory system.

10. The method of claim 9, wherein accessing the memory system can include:
    determining if the current time interval has expired, if the current time interval has expired, then:
    starting a subsequent time interval as the current time interval; and
    applying the access to the memory system.

11. The method of claim 10, wherein if the current time interval has not expired then incrementing an access counter.

12. The method of claim 9, wherein the access rate is equal to a number of accesses per a current time interval.

13. The method of claim 9, wherein selecting the memory access rate includes selecting a length for the current time interval.

14. The method of claim 13, wherein the length for the current time interval is less than a regulation time constant of a power supply of the computer system.

15. The method of claim 13, wherein the length for the current time interval is equal to about 10 microseconds.

16. The method of claim 9, wherein the desired memory power consumption rate is equal to about 66 percent of a maximum power consumption of each memory module in the memory system.

17. The method of claim 9, wherein the desired memory power consumption rate is equal to about 9 watts per memory module in the memory system.

18. The method of claim 9, wherein a DRAM controller controls access to the memory system.

* * * * *